US011552790B2

(12) United States Patent
Liu et al.

(10) Patent No.: US 11,552,790 B2
(45) Date of Patent: *Jan. 10, 2023

(54) METHOD FOR KEY SHARING BETWEEN ACCELERATORS

(71) Applicants: Baidu USA LLC, Sunnyvale, CA (US); KUNLUNXIN TECHNOLOGY (BEIJING) COMPANY LIMITED, Beijing (CN)

(72) Inventors: Yong Liu, Sunnyvale, CA (US); Yueqiang Cheng, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 354 days.

This patent is subject to a terminal disclaimer.

(21) Appl. No.: 16/693,019

(22) Filed: Nov. 22, 2019

(65) Prior Publication Data

US 2021/0160061 A1 May 27, 2021

(51) Int. Cl.

| | |
|---|---|
| ***H04L 9/40*** | (2022.01) |
| ***H04L 9/08*** | (2006.01) |
| ***G06N 5/04*** | (2006.01) |
| ***G06N 20/00*** | (2019.01) |

(52) U.S. Cl.

CPC ............ *H04L 9/0838* (2013.01); *G06N 5/04* (2013.01); *G06N 20/00* (2019.01); *H04L 9/0861* (2013.01); *H04L 9/0894* (2013.01); *H04L 63/0428* (2013.01); *H04L 63/061* (2013.01)

(58) Field of Classification Search

CPC ... H04L 9/0838; H04L 9/0861; H04L 9/0894; H04L 63/0428; H04L 63/061; G06N 20/00; G06N 5/04

USPC ........................................................ 713/171

See application file for complete search history.

(56) References Cited

U.S. PATENT DOCUMENTS

| | | | |
|---|---|---|---|
| 642,945 A | 2/1900 | Wright | |
| 6,426,945 B1 | 7/2002 | Sengodan | |
| 10,813,001 B1 | 10/2020 | Ibarra | |
| 2004/0143645 A1 | 7/2004 | Cheenath | |
| 2006/0248142 A1 | 11/2006 | Ishizaki et al. | |
| 2009/0172411 A1 * | 7/2009 | Kershaw ................ | G06F 21/53 713/189 |

(Continued)

*Primary Examiner* — Dereena T Cattungal

(74) *Attorney, Agent, or Firm* — Womble Bond Dickinson (US) LLP

(57) ABSTRACT

A host processing device instructs a plurality of data processing (DP) accelerators to configure themselves for secure communications. The host device generates an adjacency table of each of the plurality of DP accelerators. Then the host device then establishes a session key communication with each DP accelerator and sends the DP accelerator a list of other DP accelerators that the DP accelerator is to establish a session key with, for secure communications between the DP accelerators. The DP accelerator establishes a different session key for each pair of the plurality of DP accelerators. When all DP accelerators have established a session key for communication with other DP accelerators, according to the respective list of other DP accelerators sent by the host device, then the host device can assign work tasks for performance by a plurality of DP accelerators, each communicating over a separately secured communication channel.

17 Claims, 9 Drawing Sheets

100

Client Device 101

Client Device 102

Network 103

Data Processing Server(s) (e.g., host) 104

Data Processing (DP) Accelerator 105

DP Accelerator 106

DP Accelerator 107

(56) References Cited

U.S. PATENT DOCUMENTS

2010/0254537 A1* 10/2010 Buer .................... H04L 9/0822 380/279
2011/0072270 A1 3/2011 Little et al.
2011/0113244 A1 5/2011 Chou et al.
2014/0156989 A1* 6/2014 Lalwani ................. H04L 63/08 713/155
2015/0195264 A1 7/2015 Finlayson
2015/0358294 A1* 12/2015 Kancharla ............ G06F 21/335 713/164
2016/0044001 A1 2/2016 Pogorelik
2016/0127341 A1* 5/2016 Yan .......................... H04L 9/32 726/9
2016/0330301 A1* 11/2016 Raindel .............. H04L 47/2441
2018/0225237 A1* 8/2018 Edirisooriya ............ G06F 9/54
2018/0343258 A1 11/2018 Spies et al.
2019/0140979 A1* 5/2019 Levi ................... G06F 9/45558
2019/0230094 A1* 7/2019 Pietea ................ H04L 63/0435
2019/0303344 A1* 10/2019 Kong ............... G06F 15/17318
2020/0073734 A1* 3/2020 Wang ...................... G06F 9/544
2020/0133929 A1* 4/2020 Yamashita ........... G06F 16/215
2020/0323024 A1 10/2020 Huang et al.
2020/0389322 A1 12/2020 Selander et al.
2021/0176632 A1 6/2021 Lui

* cited by examiner

| HOST_104 ADJACENCY TABLE 500 | | | |
|---|---|---|---|
| ID 501 | Port 502 | Address 503 | Session Key 504 |
| DPA_105_ID | 0 | Base address | 0x4597A4D5... |
| DPA_106_ID | 1 | Base address + 4 | 0x12F7B475... |
| DPA_107_ID | 2 | Base address + 8 | 0x98B5C25D... |

| DPA_105 ADJACENCY TABLE 510 | | | |
|---|---|---|---|
| ID 511 | Port 512 | Address 513 | Session Key 514 |
| HOST_104_ID | 0 | Base address | 0x4597A4D5... |
| DPA_106_ID | 1 | Base addr + 4 | Null |
| DPA_107_ID | 2 | Base addr + 8 | Null |
| ... | ... | Base addr + (Port*4) | Null |

| DPA_106 ADJACENCY TABLE 520 | | | |
|---|---|---|---|
| ID 521 | Port 522 | Address 523 | Session Key 524 |
| HOST_104_ID | 0 | Base address | 0x12F7B475... |
| DPA_105_ID | 1 | Base addr + 4 | Null |
| DPA_107_ID | 2 | Base addr + 8 | Null |
| ... | ... | Base addr + (Port*4) | Null |

| DPA_106 ADJACENCY TABLE 530 | | | |
|---|---|---|---|
| ID 531 | Port 532 | Address 533 | Session Key 534 |
| HOST_104_ID | 0 | Base address | 0x98B5C25D... |
| DPA_105_ID | 1 | Base addr + 4 | Null |
| DPA_107_ID | 2 | Base addr + 8 | Null |
| ... | ... | Base addr + (Port*4) | Null |

FIG. 5

METHOD FOR KEY SHARING BETWEEN ACCELERATORS

TECHNICAL FIELD

Embodiments of the present disclosure relate generally to artificial intelligence model training and inference. More particularly, embodiments of the disclosure relate to sharing keys between data processing accelerators configured to communicate with each other.

BACKGROUND

Data processing accelerators (DPAs) that are configured to communicate with a host computing device generally cannot communicate securely with each other. Communication, e.g. peer-to-peer communication, between DPAs is useful so that two or more DPAs can cooperate and coordinate to perform a data processing task on behalf of a host computing device. However, it is important that DPAs communicate securely so that the processing task performed by cooperating DPAs is performed securely such that another computing entity may not alter a result produced by the communicating DPAs, and may not steal code or data from any of the communicating DPAs.

BRIEF DESCRIPTION OF THE DRAWINGS

Embodiments of the disclosure are illustrated by way of example and not limitation in the figures of the accompanying drawings in which like references indicate similar elements.

FIG. 5 is a block diagram illustrating secure communications adjacency tables between a host device and a plurality of data processing accelerators, according to an embodiment.

DETAILED DESCRIPTION

Figure 1:
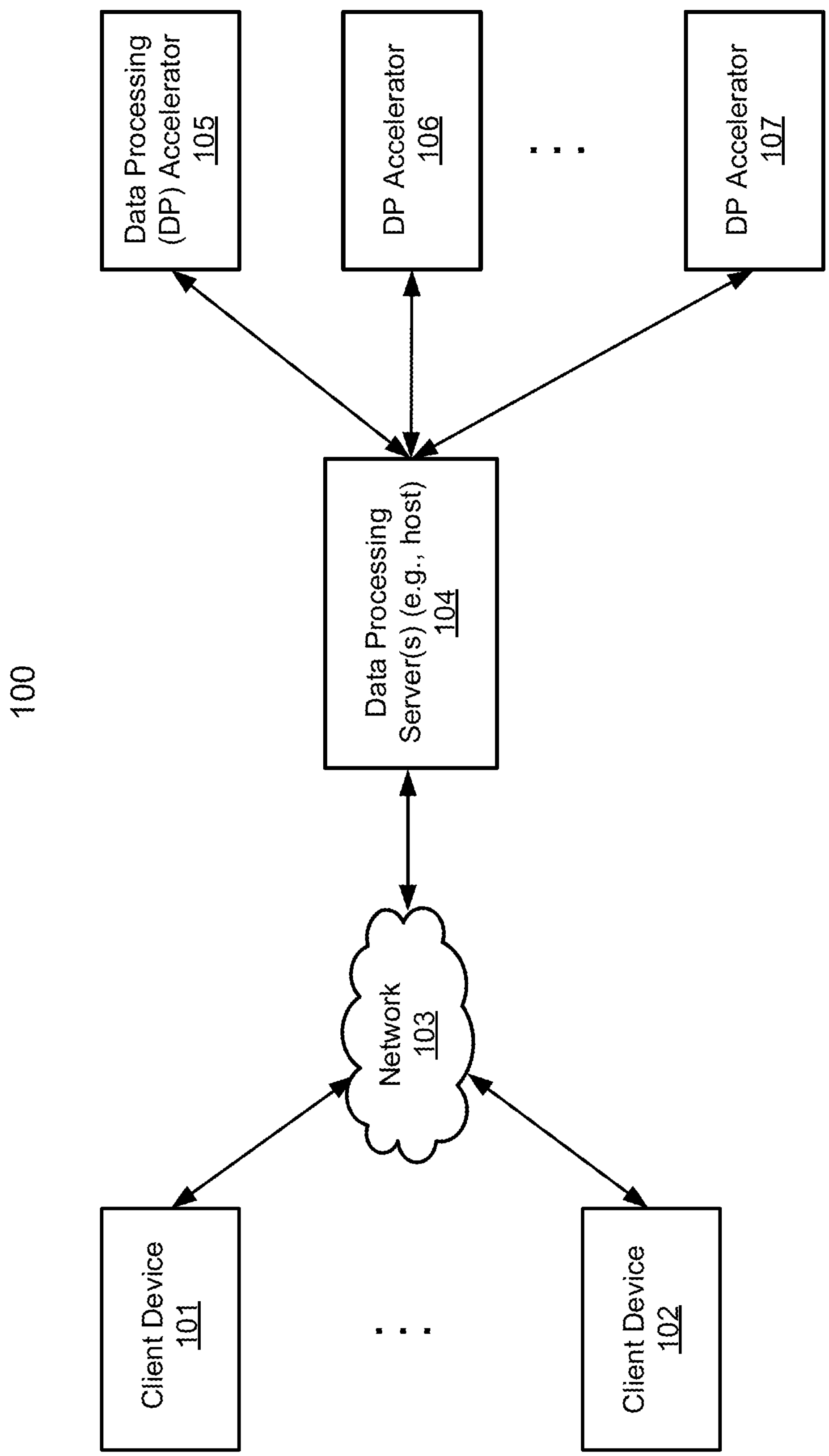
FIG. 1 is a block diagram illustrating a secure processing system, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to one or more DP accelerators. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Embodiments are described herein for generating one or more keys for securing communications between a host and a DP accelerator, and for securing communications between any two DP accelerators in a plurality of DP accelerators. In an embodiment, communications between any two DP accelerators use one or more keys that are unique with respect to any other two DP accelerators. Some of the operations include the DP accelerator using an artificial intelligence (AI) model to perform inferences using data provided by the host device. Before the AI model inferences are delegated to a DP accelerator, secure communication channels are established between the host and DP accelerator and between the DP accelerator and any other DP accelerator that may participate in the AI model inference.

In a first aspect, a computer-implemented method of a first data processing (DP) accelerator securely communicating with one or more second DP accelerators includes receiving, by the first DP accelerator, from a host device, a list of the one or more second DP accelerators. For each of the one or more second DP accelerators, a session key is determined between the first DP accelerator and the second DP accelerator. The session key is stored by the first DP accelerator in association with the second DP accelerator, and an indication is transmitted by the first DP accelerator, to the host device, that the first DP accelerator is configured for secure communication between with each of the one or more second DP accelerators. In an embodiment, the method further includes generating, by the first DP accelerator, an adjacency table with an entry for each of the one or more second DP accelerators. Each entry includes a reference to a communication port of the first DP accelerator for communicating with one of the one of more second DP accelerators. The entry further includes the session key stored in association with the one of the one or more second DP accelerators. In an embodiment, the session key generated for the first DP accelerator and the one of the one or more second DP accelerators is unique with respect to the first DP accelerator and any other of the one or more second DP accelerators. In an embodiment, each entry for one of the one or more second DP accelerators further includes a unique identifier of the one of the one or more second DP accelerators. The can method further include receiving, by the first DP accelerator, from the host device, a processing task to perform and an indication of one of the one or more second DP accelerators to perform at least a portion of the processing task. The method can further include instructing, by the first DP accelerator, the one of the one or more second DP accelerators to perform the at least a portion of the processing task, using a message that is secured with the session key associated with the first DP accelerator and the one of the one or more second DP accelerators. In an embodiment, the method can further include receiving, by the first DP accelerator, from the one of the one or more second DP accelerators, a message secured using the session key associated with the first DP accelerator and the one of the one or more second DP accelerators, the message comprising a result from the at least a portion of the task, and returning, by the first DP accelerator, a message containing a result of the processing task, the message secured using a session key that is associated with the first DP accelerator and the host device.

In some embodiments, the host device can transmit a kernel to the DP processing device to use in performing one or more operations. In this context, a kernel is a small piece of code, provided to the DP accelerator, to be executed by the DP accelerator to perform the intended function of the kernel. In an embodiment, a kernel is provided to the DP accelerator by the host device as a part of performing proof-of-trust operations by the DP accelerator that will be validated by the host device. In some embodiments, the DP accelerator is not aware of the purpose of the kernel it executes on behalf of the host device.

In some embodiments, the kernel can be a "watermark-enabled kernel." A watermark-enabled kernel is a kernel that, when executed, is capable of extracting a watermark from an artificial intelligence (AI) model. An AI watermark is associated with a specific AI model and can be embedded or "implanted," within the AI model using several different methods. The watermark may be implanted into one or more weight variables of the one or more nodes of the AI model. In an embodiment, the watermark is stored in one or more bias variables of the one or more nodes of the AI modes, or by creating one or more additional nodes of the AI model during the training to store the watermark.

In second aspect, a host device includes a processing system includes one or more processors and a memory coupled to the processor to store instructions. The instructions, when executed by the processor, cause the processor to perform operations for the host device that configure a plurality of data processing (DP) accelerators for secure communication. The operations include, for each DP accelerator in the plurality of DP accelerators: establishing a session key between the host device and the DP accelerator, and storing, by the host device, the session key in an adjacency table for the host, wherein each entry in the adjacency table includes: the session key, a reference to a communication port of the host device for communicating with the DP accelerator, and a unique identifier of the DP accelerator. The adjacency table enables the host device to communicate securely with each DP accelerator in the plurality of DP accelerators, using a session key that is unique to the particular DP accelerator that the host device is communicating with. The operations further include the host device transmitting, to the DP accelerator, a list of one or more additional DP accelerators, and an instruction that the DP accelerator generate a unique session key for each additional DP accelerator for securing communication between the DP accelerator and the additional DP accelerator in the list of one or more additional DP accelerators. The operations further include receiving, from the DP accelerator, an indication that the DP accelerator has finished generating the unique session keys for communicating between the DP accelerator and the one or more additional DP accelerators. Once the DP accelerator acknowledges that the DP accelerator has finished establishing a unique session key for secure communications for each of the additional DP accelerators, the host device can begin assigning processing tasks to DP accelerators. In an embodiment, the operations further include transmitting, by the host device, to the DP accelerator, a processing task for the DP accelerator and at least one of the one or more additional DP accelerators to perform, the transmitting secured using the session key established for the host device and the DP accelerator. The host device can receive, from the DP accelerator, a result from the processing task. The result can be secured using the session key established for the host device and the DP accelerator. In an embodiment, transmitting the processing task can include transmitting instructions from the host device to the DP accelerator that a sub-task of the processing task is to be performed by a specific one of the one or more additional DP accelerators. In an embodiment, the processing task can be one or more of: an artificial intelligence inference, encrypting or decrypting data, digitally signing data, extracting a watermark from an AI model, implanting a watermark into an AI model, implanting a watermark into an AI model inference result, or combinations of these.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107 according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions.

Figure 2A:
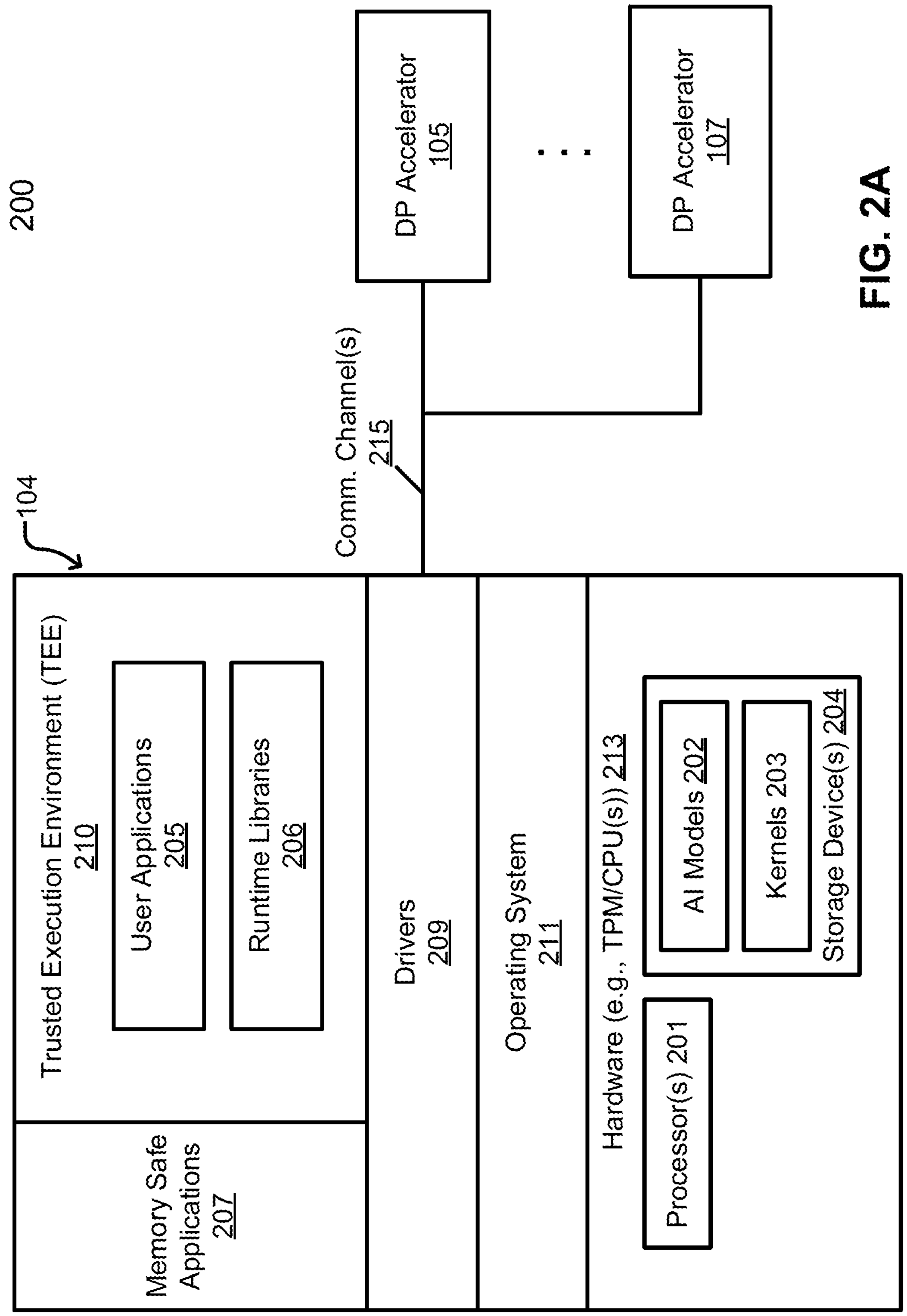
FIGS. 2A and 2B are a block diagrams illustrating a secure computing environment between one or more hosts and one or more data processing accelerators, according to one embodiment.

FIG. 2A is a block diagram illustrating an example of a multi-layer protection solution for obscured communications between a host system 104 and data process (DP) accelerators 105-107 according to some embodiments. In one embodiment, system 200 provides a protection scheme for obscured communications between host 104 and DP accelerators 105-107 with or without hardware modifications to the DP accelerators. Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot. The TPM chip can include a secure memory for storing keys that are rooted, e.g. in hardware, and keys that are derived from the rooted keys. In an embodiment, secure storage can include a rooted asymmetric key pair (RK): a public key (PK_RK) and a private key (SK_RK) of the asymmetric rooted key (RK) pair.

The TPM chip also secure driver(s) 209 and operating system (OS) 211 in a working kernel space to communicate with the DP accelerators 105-107. Here, driver 209 is provided by a DP accelerator vendor and can serve as a driver for the user application to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively occupied by the OS 211 and driver 209, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels. Communication channels may be connected to one or more hardware communication ports, accessible by drivers 209, for communicating over communication channels 215 with DP accelerators 105-107. Communication channels 215 may be secured using a session key as described herein. Each communication channel 215 may be secured using a different session key than other communication channels 215. Drivers 209 may include an adjacency table that maps DP accelerators 105-107 each to a hardware communication port, and a session key associated with each hardware communication port.

Host machine 104 can include trusted execution environment (TEE) 210 which is enforced to be secure by TPM/CPU 213. A TEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provides a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels as predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 are not necessary, e.g., user application 205 and/or runtime libraries 206 are hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm. Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations. Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model. Systems and methods for sharing keys used for obfuscation are described herein, below.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
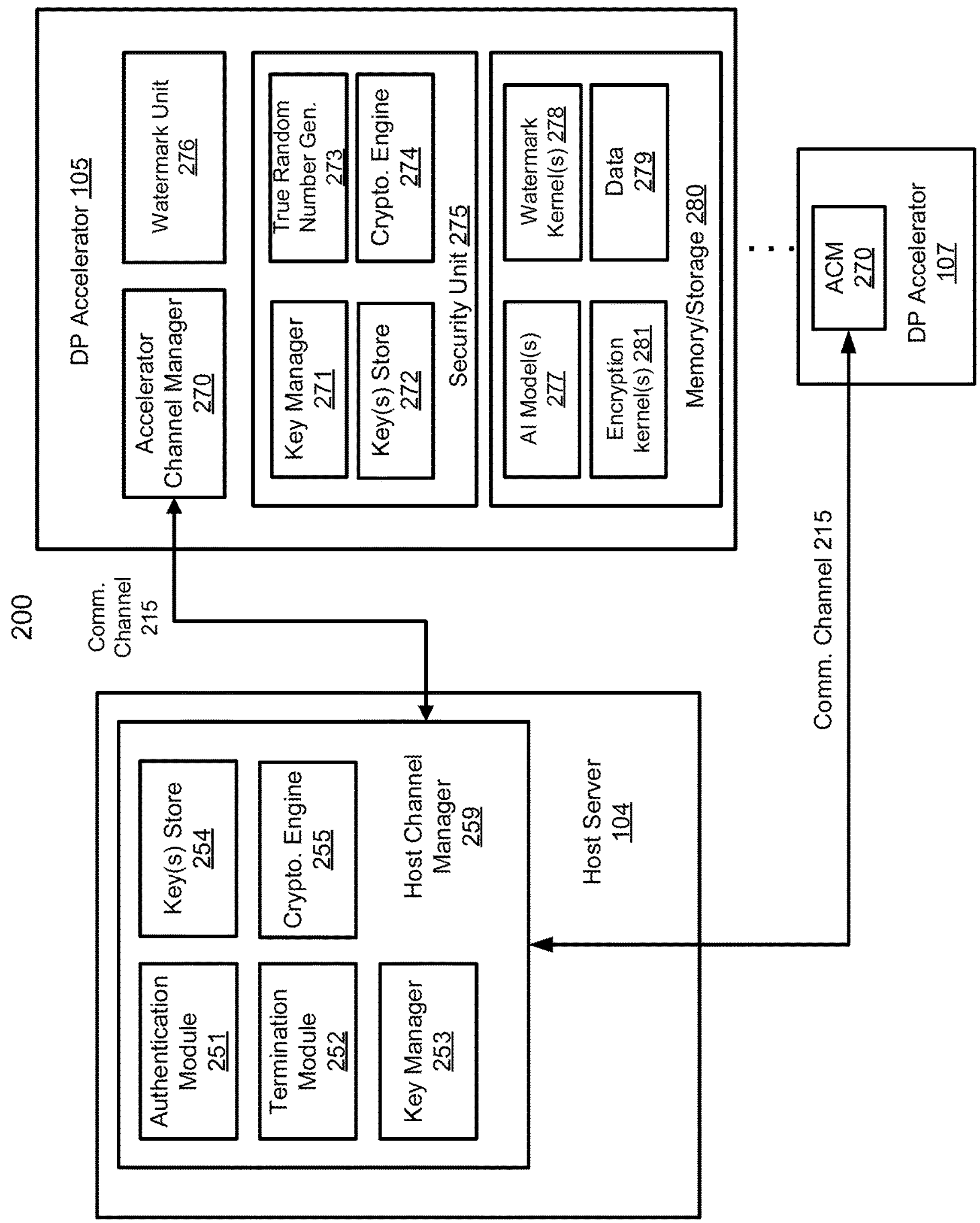

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105-107). Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215.

Figure 3:
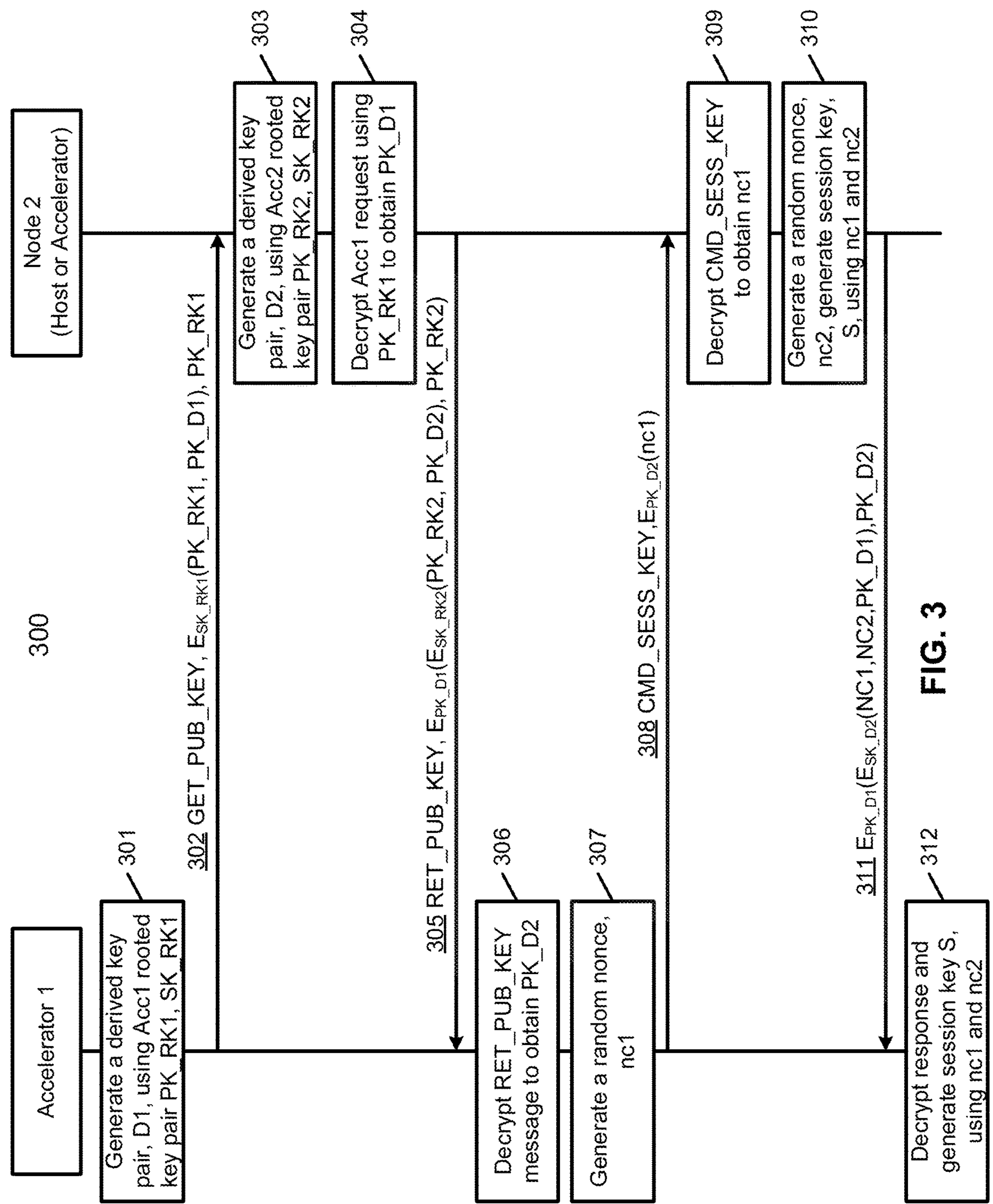
FIG. 3 is a block diagrams illustrating a method of a host and data processing accelerator, or two data processing accelerators, generating a session key for securing communications, according to an embodiment.

FIG. 3 is a block diagrams illustrating a method 300 of a host and data processing accelerator, or two data processing accelerators, generating a session key for securing communications, according to an embodiment. Method 300 can be used between a first data processing (DP) accelerator "Accelerator 1" and a second node, "Node 2." Node 2 can be either a host device or second DP accelerator. Accelerator 1 has a rooted key pair PK_RK1 and SK_RK1. PK_RK1 is a public key of a rooted asymmetric key pair of Accelerator 1 (RK1). SK_RK1 is a private (secret) key (SK) of rooted asymmetric key pair of Accelerator 1 (RK1). Rooted key pair RK1 is stored in a secured storage of Accelerator 1. Similarly, Node 2 (either a host or another DP accelerator) has a rooted key pair PK_RK2 and SK_RK2. RK2 can be stored in a secure storage of Node 2.

In operation 301, Accelerator 1 generates a derived asymmetric key pair, PK_D1 and SK_D1, from rooted key pair PK_RK1 and SK_RK1. Deriving an asymmetric key pair is known in the art and will not be described herein.

In operation 302, Accelerator 1 sends to Node 2, a "Get Public Key" command (GET_PUB_KEY) to request a public key of Node 2. The GET_PUB_KEY includes encrypting two of Accelerator 1's public keys: PK_RK1 and PK_D1. In an embodiment, PK_RK1 and PK_D1 can be encrypting using Accelerator 1's private rooted key SK_RK1. The GET_PUB_KEY command further includes Accelerator 1's public rooted key, PK_RK1 in clear-text form. Node 2 can decrypt Accelerator 1's encrypted keys using PK_RK1 and verify that the GET_PUB_KEY request did, in fact, come from Accelerator 1.

In operation 303, Node 2 generates a derived asymmetric key pair PK_D2 and SK_D2 from Node 2's rooted key pair PK_RK2 and SK_RK2. Derived keys PK_D2 and SK_D2 can be stored in secure storage at Node 2.

In operation 304, Node 2 can decrypt the received "GET_PUB_KEY" command from Accelerator 1, using the clear-text public rooted key of Accelerator 1: PK_RK1. Once decrypted, Node 2 obtains Accelerator 1's derived public key: PK_D1.

In operation 305, Node 2 sends to Accelerator 1 a "Return Public Key" (RET_PUB_KEY) message. The message includes Node 2's PK_RK2 and PK_D2, encrypted using Node 2's private rooted key, SK_RK2. Node 2's public rooted key PK_RK2 is packaged with the encrypted keys PK_RK2 and PK_D2, and packaged keys are then encrypted using Accelerator 1's derived public key PK_D1.

In operation 306, Accelerator 1 decrypts the RET_PUB_KEY message using Accelerator 1's private derived key SK_D1. After decryption, Accelerator 1 can obtain Node 2's public rooted key, PK_RK2. Accelerator 1 then decrypts the encrypted keys PK_RK2 and PK_D2 using Node 2's newly-obtained public rooted key, PK_RK2. Accelerator 1 can then obtain Node 2's derived public key, PK_D2. In an embodiment, Accelerator 1 can verify PK_RK2 either, or both, the decrypted PK_RK2 and clear-text PK_RK2 by checking with the host device or a history copy of PK_RK2.

In operation 307, Accelerator 1 can generate a nonce, "nc1."

In operation 308, Accelerator 1 can send a command "Generate Session Key" (CMD_SESS_KEY) to Node 2. The command includes nonce nc1, encrypted using Node 2's public derived key PK_D2. CMD_SESS_KEY instructs Node 2 to generate a session key from Accelerator 1's nonce nc1 and a nonce nc2 that is generated by Node 2.

In operation 309, Node 2 can decrypt nonce nc1 in the received CMD_SESS_KEY using Node 2's private derived key SK_D2.

In operation 310, Node 2 can generate a nonce, nc2. Node 2 can then generate a session key, based on nonces nc1 and nc2. Node 2 stores the session key in an adjacency table of Node 2. The session key is stored in association with Accelerator 1 and a unique identifier of Accelerator 1.

In operation 311, Node 2 can send nonce nc2 to Accelerator 1. Node 2 packages nc1, nc2, and PK_D1 in a first package and encrypts the first package using Node 2's private derived key, SR_D2. Node 2 then adds PK_D2 to the encrypted first package, and generates a second encrypted package that is encrypted using Accelerator 1's public derived key, PK_D1. The encrypted second package is then transmitted to Accelerator 1.

In operation 312, Accelerator 1 receives the encrypted second package from Node 2 and decrypts the second package using Accelerator 1's derived private key, SK_D1. Accelerator 1 can then remove PK_D2 from the decrypted second package, leaving just the encrypted first package. In an embodiment, Accelerator 1 can verify that PK_D2 removed from the decrypted second package matches the PK_D2 previously received in operation 305 and decrypted in operation 306, above. Accelerator 1 can also verify that the nc1 obtained from the decrypted first package, and previously sent to Node 2 in operation 308, has not expired (aka, "verify freshness"). Accelerator 1 can then generate a session key based upon nonces nc1 and nc2. Accelerator 1 can store the generated session key in Accelerator 1's adjacency table, in association with a unique identifier of the Node 2 and the session key.

At this point, both Accelerator 1 and Node 2 have a same session key that was derived from nonces nc1 and nc2 Both Accelerator 1 and Node 2 have stored the session key in their respective adjacency tables. Adjacency tables are described in detail, below, with reference to FIG. 5.

Figure 4:
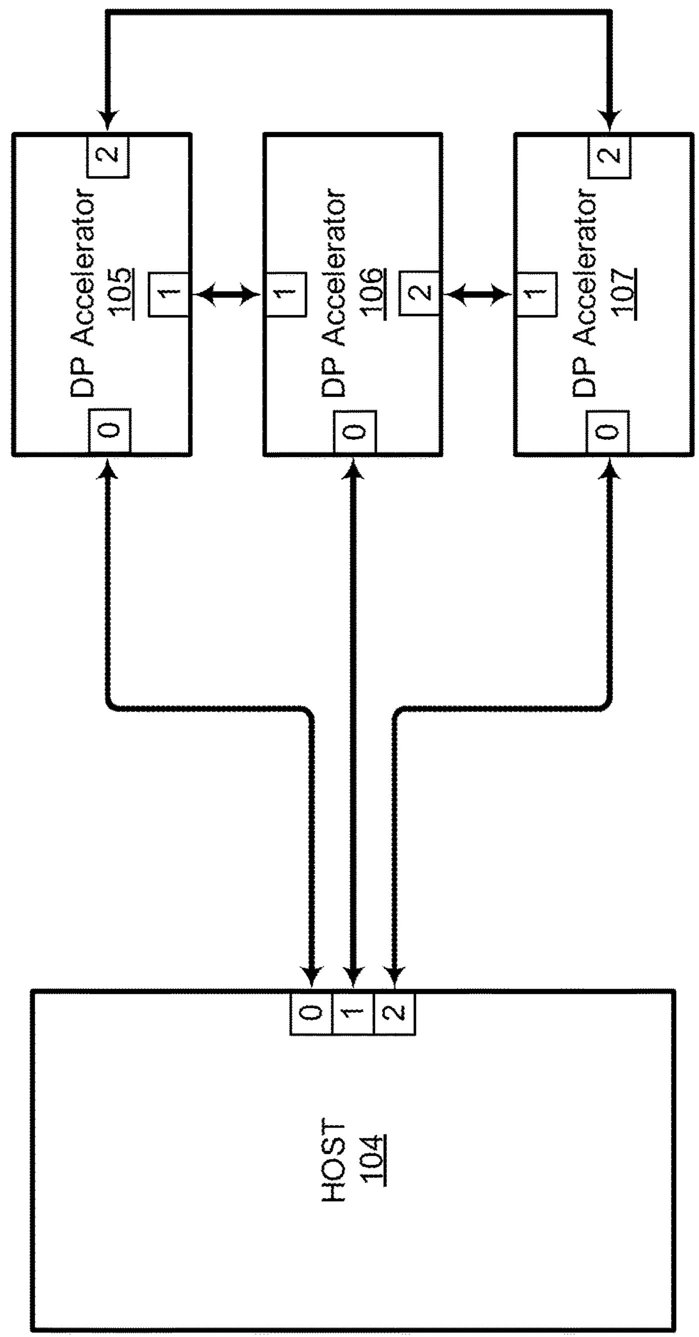
FIG. 4 is a block diagram illustrating a hardware configuration of a host computing device and a plurality of data processing accelerators that securely communicate with one another, according to an embodiment.

FIG. 4 is a block diagram illustrating a hardware configuration 400 of a host computing device 104 and a plurality of data processing accelerators 105-107 that securely communicate with one another, according to an embodiment.

Host 104 is communicatively coupled to each of DP accelerator 105, 106, and 107. Host 104 includes a communication interface having, e.g., ports 0, 1, and 2. In FIG. 4, DP accelerator 105's communication port 0 is communicatively coupled to host 104's communication port 0. DP accelerator 106's communication port 0 is communicatively coupled to host 104's communication port 1. DP accelerator 107's communication port 0 is communicatively coupled to host 104's communication port 2. DP accelerator's 105-107 are also communicatively coupled to each other. DP accelerator 105's communication port 1 is communicatively coupled to DP accelerator 106's communication port 1. DP accelerator 105's communication port 2 is communicatively coupled to DP accelerator 107's communication port 2. DP accelerator 106's communication port 2 is communicatively coupled to DP accelerator 107's communication port 1. Each of the foregoing communication channels is secured by a different session key for the other communication channels. Thus, is any one of the communication channels is compromised, the other communication channels are still secure. Further, there is redundancy in communication with respect to the host device 104. Each DP accelerator 105-107 can monitor their own communication ports to ensure that the each communication channel is operable. If a channel fails, one or both of the DP accelerators at either end of the channel can notify the host 104 of the failed communication channel.

Each of the host 104, and DP accelerator 105, 106, and 107, can have an adjacency table that stores a list of nodes (DP accelerators or host) that the host 104 or DP accelerator 105-107 is communicatively coupled to. Adjacency tables are described below, with reference to FIG. 5.

FIG. 5 is a block diagram illustrating secure communications adjacency tables 500, 510, 520, and 530 between a host device 104 and a plurality of data processing (DP) accelerators 105-107, according to an embodiment.

As shown in FIG. 4, above, host 104 and DP accelerators 105-107 are communicatively coupled via communication ports on each of the host and DP accelerators. Host 104, e.g., can have an adjacency table 500 that lists the DP accelerators (DPA) that are communicatively coupled to host 104. DP accelerators, e.g. 105-107, can have a unique ID 501, e.g. DP_105_ID, etc., so that the DP accelerator can be referred to by name. In an embodiment, when a host wants to send a message to a DP accelerator, the message can have the format [source, message payload, destination]. Host can refer to itself, as sender, by its own ID 501 e.g. HOST_104_ID. Host can refer to a destination DP accelerator by its unique ID 501, by a port 502 to which the DP accelerator is connected at the host, or by the address 503 in memory to which DP accelerator port is connected at the host. Thus, if host having ID 501 of HOST_104_ID sends a message to DP accelerator 106, the host can look up the ID 501 of DP accelerator 106, or the port 502, or address of the port 503 to use as the destination address for the message. The message can be encrypted using the session key 504 for the host and DP accelerator 106. Similarly, DP accelerator 105 can have an adjacency table 510, stored in memory of DP accelerator 105, indicating an ID, port 512, address 513, and session key 514 for communicating with each of host 104, DP accelerator 106, or DP accelerator 107. DP accelerator 106 can have an adjacency table 520, stored in memory of DP accelerator 106, indicating an ID 521, port 522, address 523, and session key 524 for communicating with each of host 104, DP accelerator 105, and DP accelerator 107. DP accelerator 107 can have an adjacency table 530, stored in memory of DP accelerator 107, indicating an ID 531, port 532, address 533, and session key 534 of host 104, DP accelerator 105, and DP accelerator 107.

Determining and generating session keys for each channel between two devices (host to DP accelerator, or DP accelerator to DP accelerator) are described above with reference to FIG. 3, and a method is described below with reference to FIG. 6. A session key of NULL indicates that the session key has not yet been determined between the two nodes (host or DP accelerator) referenced in the line item of the adjacency table having the NULL session key. For example, DP accelerator 106 adjacency table 520 indicates a line item for DP accelerator 105, having unique ID DPA_105_ID, and a null session identifier. The null session identifier indicates that DP accelerator 106 and DP accelerator 105 have not yet determined a session key for communication between DP accelerator 106 and DP accelerator 105.

Figure 6:
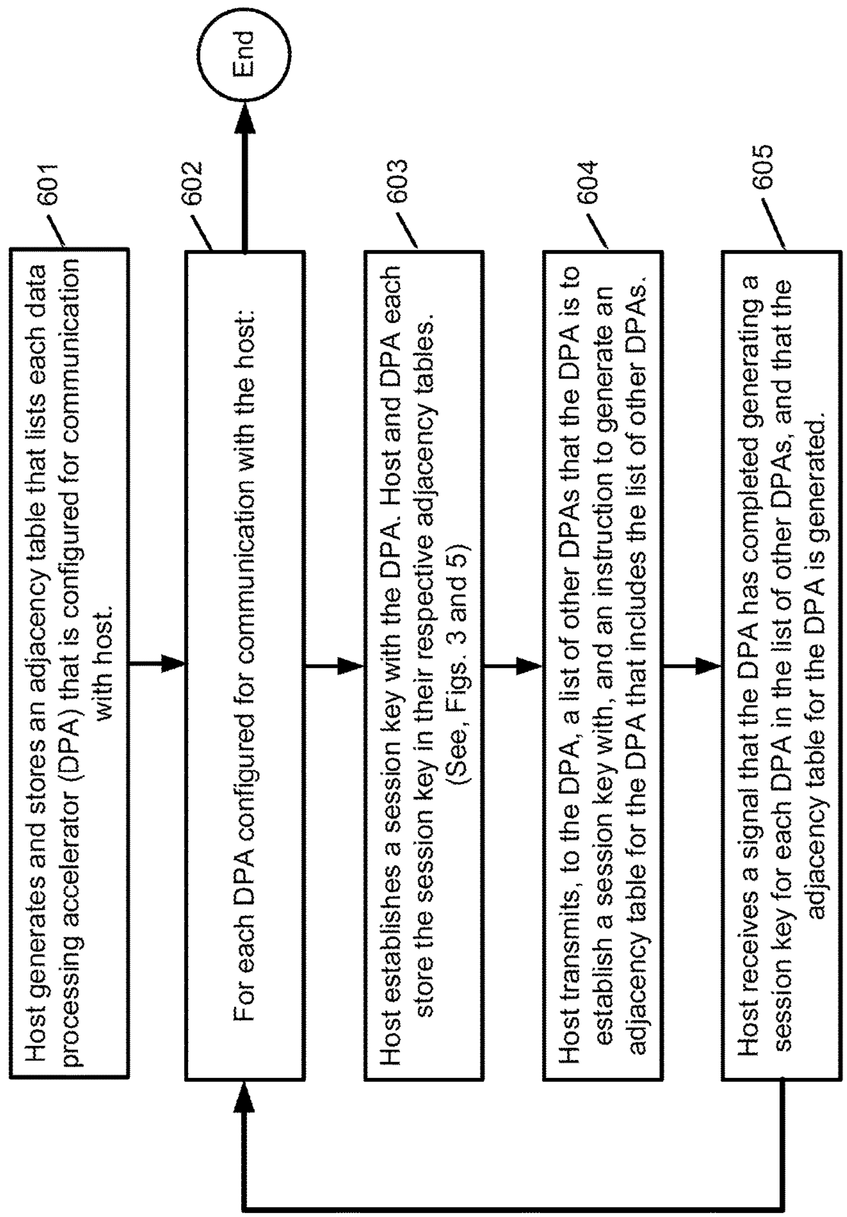
FIG. 6 is block diagrams illustrating a method 600 of a host device instructing a plurality of data processing accelerators to configure themselves for secure communications, according to an embodiment.

FIG. 6 is block diagrams illustrating a method of a host device instructing a plurality of data processing accelerators to configure themselves for secure communications, according to an embodiment.

In operation 601, a host, e.g. host 104, generates and stores an adjacency table that lists each DP accelerator that is configured for communication with the host. In an embodiment, one or more DP accelerators can be configured by a system administrator using a configuration file. The configuration file can indicate which DP accelerators can communicate with which other DP accelerators. The configuration file can specify the unique identifier for the host and DP accelerators, the specific communication port number to which each DP accelerator is assigned, and/or the memory address corresponding to the host communication port number associated with the DP accelerator. There can be any number of DP accelerators. For simplicity, one host, 104, and three DP accelerators, e.g. 105-107, are described. The generated adjacency table for the host can be similar to host table 500, described above with reference to FIG. 5.

In operation 602, logic in the host can iterate through the list of DP accelerators configured for the host. For each DP accelerator, operations 603 through 605 can be performed. In there are no more DP accelerators in the list, then method 600 ends.

In operation 603, host selects a DP accelerator from the list and generates a session key with the selected DP accelerator. Generating a session key between an accelerator and a host (Node) is described above with reference to FIG. 3. Host stores the generated session key in an entry in the adjacency table corresponding to the selected DP accelerator. Host uses the configuration file complete the entry in the adjacency table, including the unique identifier of the DP accelerator, the port number of the host for communicating with the DP accelerator, and the memory address of the port. In an embodiment, the memory address can be calculated from a base address of the communication ports, and an offset in memory for each port number.

In operation 604, host transmits instructions to the selected DP accelerator for the DP accelerator to create its own adjacency table. The information in the host-transmitted instructions can be obtained from the configuration file. The instructions include a list of other DP accelerators that the selected DP accelerator is to include when the selected DP accelerator generates its own adjacency table. The instructions can further include a unique identifier of each of the other DP accelerators, a port number of the selected DP accelerator to assign to each of the other DP accelerators, a memory address to assign to each of the other DP accelerators, and a NULL value for the session key associated with each of the other DP accelerators. The instructions further include an instruction that the selected DP accelerator is to generate its own adjacency table, and to generate and store a session key with each of the other DP accelerators in the adjacency table of the selected DP accelerator. A method for a selected DP accelerator to generate its own adjacency table is described below with reference to FIG. 7.

In operation 605, host receives a signal from the selected DP accelerator that the selected DP accelerator has generated its own adjacency table, populated the adjacency table with the information provided in operation 604, above, and has generated and stored a session key for each of the other DP accelerators in the selected DP accelerator's adjacency table. Method 600 continues at operation 602.

Figure 7:
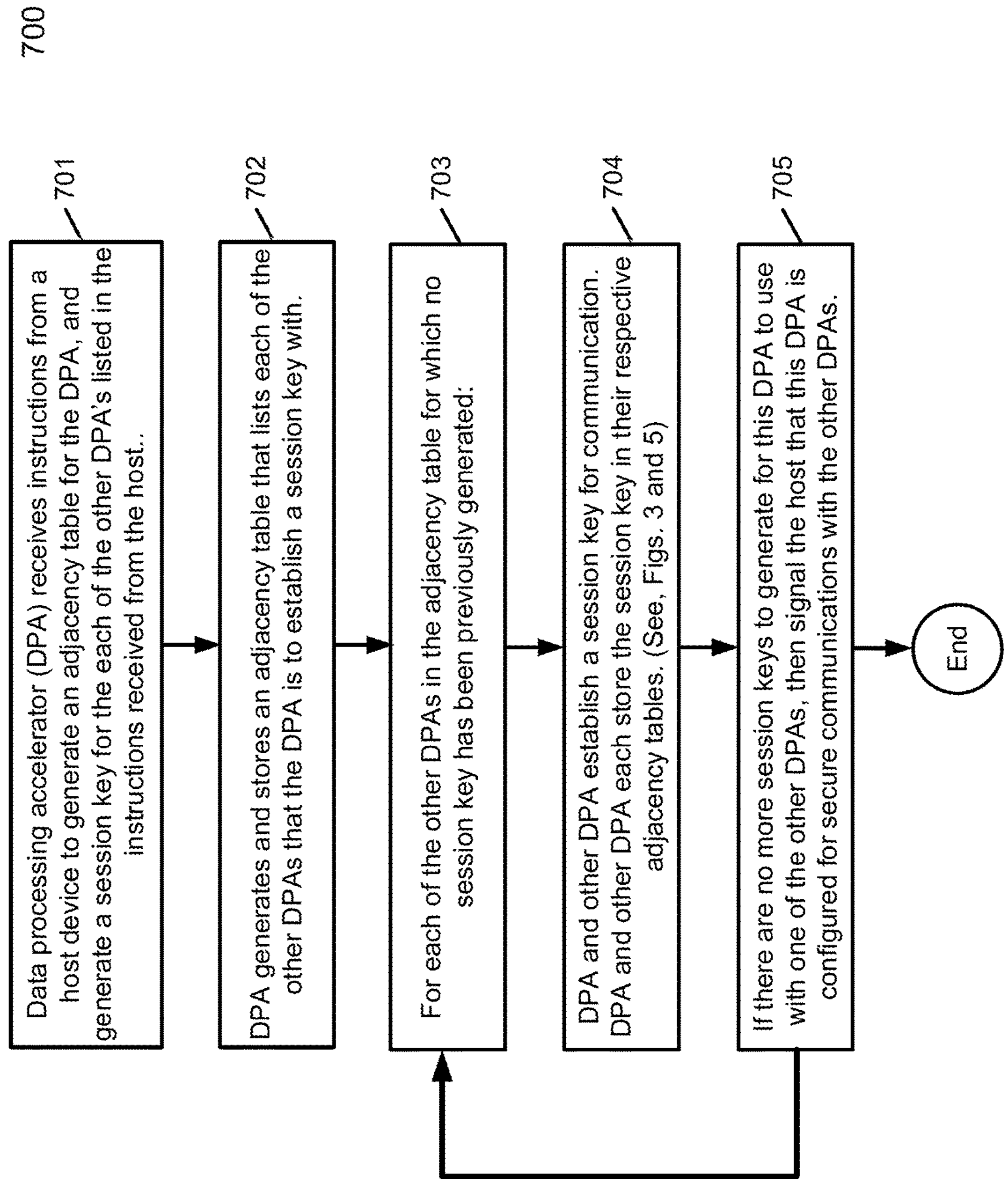
FIG. 7 is a block diagram illustrating a method 700 of a data processing accelerator configuring itself for secure communication with one or more other data processing accelerators, according to an embodiment.

FIG. 7 is a block diagram illustrating a method 700 of a data processing accelerator configuring itself for secure communication with one or more other data processing accelerators, according to an embodiment.

In operation 701, a DP accelerator ("this" DP accelerator) receives instructions from a host device to generate an adjacency table for this DP accelerator. The information in the host-transmitted instructions can be obtained by the host from an administrator-created configuration file. In an embodiment, the instructions can be default instructions. The instructions include a list of other DP accelerators that the DP accelerator is to include when this DP accelerator generates its own adjacency table. The instructions can further include a unique identifier of each of the other DP accelerators, a port number of this DP accelerator to assign to each of the other DP accelerators in the instructions, a memory address to assign to each of the other DP accelerators, and a NULL value for the session key associated with each of the other DP accelerators. The instructions further include an instruction that the DP accelerator is to generate its own adjacency table, and to generate and store a session key with each of the other DP accelerators in the adjacency table of this DP accelerator.

In operation 702, the DP accelerator stores the adjacency table that lists each of the other DP accelerators that this DP accelerator is to generate and store a session key for.

In operation 703, logic of the DP accelerator iterates through the list of other DP accelerators. If there are more DP accelerators in the list of other DP accelerators, then the logic selects a next DP accelerator from the list.

In operation 704, the ("this") DP accelerator and the selected DP accelerator generate a session key for use in communicating between this DP accelerator and the selected DP accelerator. Generating a session key between a DP accelerator and a node (host or DP accelerator) is described above with reference to FIG. 3. DP accelerator logic stores the session key in its adjacency table for this DP accelerator, in association with the selected DP accelerator.

In operation 705, if there are no more DP accelerators in the list, and thus no more session keys to generate, then this DP accelerator transmits a message or signal to the host that this DP accelerator has finished generating its adjacency table and has generated a session key for secure communication with each of the other DP accelerators in the adjacency table. In an embodiment, each session key in the adjacency table is different than other session keys in the adjacency table.

Figure 8:
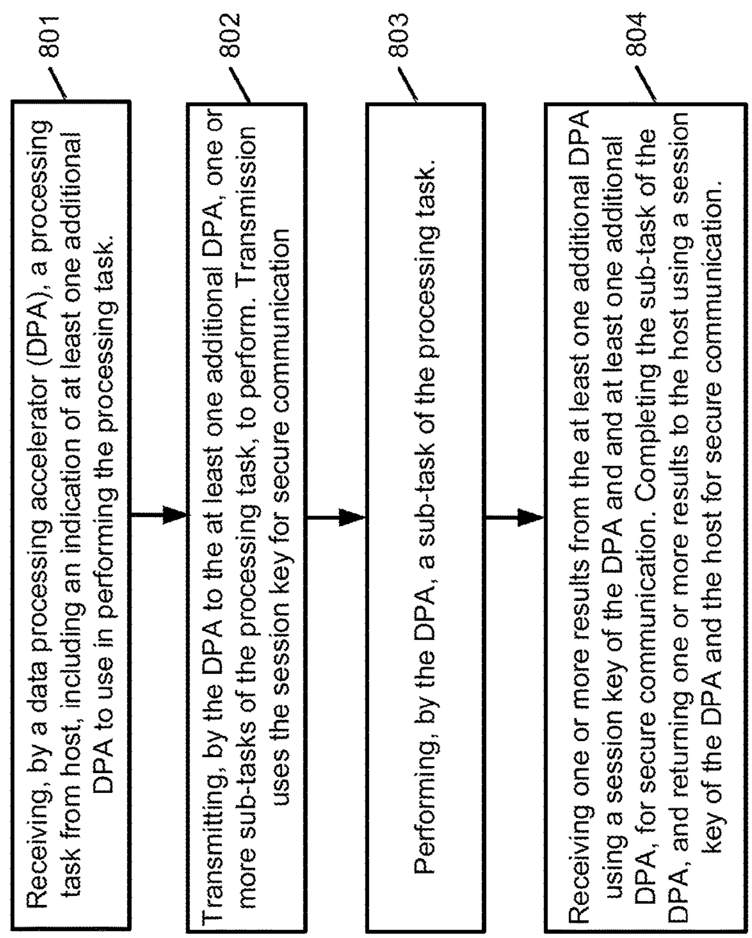
FIG. 8 is block diagram illustrating a method of a data processing accelerator receiving a processing task from a host and performing one or more sub-tasks of the tasks by one or more additional data processing accelerators, according to an embodiment.

FIG. 8 is block diagram illustrating a method 800 of a data processing accelerator receiving a processing task from a host and performing one or more sub-tasks of the tasks by one or more additional data processing accelerators, according to an embodiment.

In operation 801, a DP accelerator receives a processing task from a host device. In an embodiment, the processing task includes instructions on dividing the processing task into sub-tasks that are to be processed on at least on additional DP accelerator, and the DP accelerator has an entry in the adjacency table of the DP accelerator for securely communicating with the at least one additional DP accelerator. In this embodiment, it is assumed that host determined that the at least one additional DP accelerator is, or soon will be, idle such that the at least one additional DP accelerator can perform one or more sub-tasks on behalf of the DP accelerator.

In operation 802, the DP accelerator transmits one or more sub-tasks to the at least one additional DP accelerator with instructions to perform the sub-task(s). The at least one additional DP accelerator performs the one or more sub-tasks.

In operation 803, the DP accelerator also performs one or more sub-tasks of the received processing task.

In operation 804, the DP accelerator receives one or more results from the at least one additional DP accelerator. The DP accelerator completes its one or more sub-tasks of the processing tasks, and returns, to the host, one or more results from the one or more sub-tasks perform by the DP accelerator and the one or more sub-tasks performed by the at least one additional DP accelerator. Method 800 ends.

With respect to any of the above aspects, a host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of a first data processing (DP) accelerator securely communicating with one or more second DP accelerators:

receiving, by the first DP accelerator, from a host device, a list of the one or more second DP accelerators, wherein the host device is communicatively coupled to the first DP accelerator and each of the one or more second DP accelerators through different ports, and wherein the first DP accelerator is communicatively coupled to each of the one or more second DP accelerators;

for each of the one or more second DP accelerators:

determining a session key between the first DP accelerator and the second DP accelerator;

storing, by the first DP accelerator, the session key in association with the second DP accelerator;

generating, by the first DP accelerator, an adjacency table with an entry for each of the one or more second DP accelerators, each entry comprising a reference to a communication port of the first DP accelerator for communicating with one of the one of more second DP accelerators, and the entry further comprises the session key stored in association with the one of the one or more second DP accelerators; and transmitting, by the first DP accelerator, to the host device, an indication that first DP accelerator is configured for secure communication between with each of the one or more second DP accelerators.

2. The method of claim 1, wherein the session key generated for the first DP accelerator and the one of the one or more second DP accelerators is unique with respect to the first DP accelerator and any other of the one or more second DP accelerators.

3. The method of claim 1, wherein each entry for one of the one or more second DP accelerators further includes a unique identifier of the one of the one or more second DP accelerators.

4. The method of claim 1 further comprising:

receiving, by the first DP accelerator, from the host device, a processing task to perform and an indication of one of the one or more second DP accelerators to perform at least a portion of the processing task; and instructing, by the first DP accelerator, the one of the one or more second DP accelerators to perform the at least a portion of the processing task, using a message that is secured with the session key associated with the first DP accelerator and the one of the one or more second DP accelerators.

5. The method of claim 4, further comprising:

receiving, by the first DP accelerator, from the one of the one or more second DP accelerators, a message secured using the session key associated with the first DP accelerator and the one of the one or more second DP accelerators, the message comprising a result from the at least a portion of the task; and returning, by the first DP accelerator, a message containing a result of the processing task, the message secured using a session key that is associated with the first DP accelerator and the host device.

6. A non-transitory machine-readable medium having instructions stored therein, which when executed by a processor, cause the processor to perform operations of a first data processing (DP) accelerator securely communicating with one or more second DP accelerators, the operations comprising:

receiving, by the first DP accelerator, from a host device, a list of the one or more second DP accelerators, wherein the host device is communicatively coupled to the first DP accelerator and each of the one or more second DP accelerators through different ports, and wherein the first DP accelerator is communicatively coupled to each of the one or more second DP accelerators;

for each of the one or more second DP accelerators:

generating a session key between the first DP accelerator and the second DP accelerator, wherein the session key generated for the first DP accelerator and the one of the one or more second DP accelerators is unique with respect to the first DP accelerator and any other of the one or more second DP accelerators;

storing, by the first DP accelerator, the session key in association with the second DP accelerator;

generating, by the first DP accelerator, an adjacency table with an entry for each of the one or more second DP accelerators, each entry comprising a reference to a communication port of the first DP accelerator for communicating with one of the one of more second DP accelerators, and the entry further comprises the session key stored in association with the one of the one or more second DP accelerators; and transmitting, by the first DP accelerator, to the host device, an indication that the first DP accelerator is configured for secure communication between with each of the one or more second DP accelerators.

7. The machine-readable medium of claim 6, wherein the operations further comprise:

receiving, by the first DP accelerator, from the host device, a processing task to perform and an indication of one of the one or more second DP accelerators to perform at least a portion of the processing task; and instructing, by the first DP accelerator, the one of the one or more second DP accelerators to perform the at least a portion of the processing task, using a message that is secured with the session key associated with the first DP accelerator and the one of the one or more second DP accelerators.

8. The machine-readable medium of claim 7, wherein the operations further comprise:

receiving, by the first DP accelerator, from the one of the one or more second DP accelerators, a message secured using the session key associated with the first DP accelerator and the one of the one or more second DP accelerators, the message comprising a result from the at least a portion of the task; and returning, by the first DP accelerator, a message containing a result of the processing task, the message secured using a session key that is associated with the first DP accelerator and the host device.

9. A data processing system, comprising:

a processor; and a memory coupled to the processor to store instructions, which when executed by the processor, cause the processor to perform operations of a first data processing (DP) accelerator securely communicating with one or more second DP accelerators, the operations comprising:

receiving, by the first DP accelerator, from a host device, a list of the one or more second DP accelerators, wherein the host device is communicatively coupled to the first DP accelerator and each of the one or more second DP accelerators through different ports, and wherein the first DP accelerator is communicatively coupled to each of the one or more second DP accelerators;

for each of the one or more second DP accelerators:

determining a session key between the first DP accelerator and the second DP accelerator;

storing, by the first DP accelerator, the session key in association with the second DP accelerator;

generating, by the first DP accelerator, an adjacency table with an entry for each of the one or more second DP accelerators, each entry comprising a reference to a communication port of the first DP accelerator for communicating with one of the one of more second DP accelerators, and the entry further comprises the session key stored in association with the one of the one or more second DP accelerators; and transmitting, by the first DP accelerator, to the host device, an indication that the first DP accelerator is configured for secure communication between with each of the one or more second DP accelerators.

10. The system of claim 9, wherein the session key generated for the first DP accelerator and the one of the one or more second DP accelerators is unique with respect to the first DP accelerator and any other of the one or more second DP accelerators.

11. The system of claim 9, wherein each entry for one of the one or more second DP accelerators further includes a unique identifier of the one of the one or more second DP accelerators.

12. The system of claim 9, wherein the operations further comprise:

receiving, by the first DP accelerator, from the host device, a processing task to perform and an indication of one of the one or more second DP accelerators to perform at least a portion of the processing task; and instructing, by the first DP accelerator, the one of the one or more second DP accelerators to perform the at least a portion of the processing task, using a message that is secured with the session key associated with the first DP accelerator and the one of the one or more second DP accelerators.

13. The system of claim 12, wherein the operations further comprise:

receiving, by the first DP accelerator, from the one of the one or more second DP accelerators, a message secured using the session key associated with the first DP accelerator and the one of the one or more second DP accelerators, the message comprising a result from the at least a portion of the task; and returning, by the first DP accelerator, a message containing a result of the processing task, the message secured using a session key that is associated with the first DP accelerator and the host device.

14. A processing system, comprising:

one or more processors; and a memory coupled to the processor to store instructions, which when executed by the processor, cause the processor to perform operations for a host device configuring a plurality of data processing (DP) accelerators securely communicate, the operations comprising:

for each DP accelerator in the plurality of DP accelerators:

establishing a session key between the host device and the DP accelerator;

storing, by the host device, the session key in an adjacency table for the host, wherein each entry in the adjacency table includes: the session key, a reference to a communication port of the host device for communicating with the DP accelerator, and a unique identifier of the DP accelerator transmitting, to the DP accelerator, a list of one or more additional DP accelerators, and an instruction that the DP accelerator generate a unique session key for each additional DP accelerator for securing communication between the DP accelerator and the additional DP accelerator in the list of one or more additional DP accelerators, wherein the host device is communicatively coupled to the DP accelerator and each of the additional DP accelerators through different ports, and wherein the DP accelerator is communicatively coupled to each of the additional DP accelerators; and receiving, from the DP accelerator, an indication that the DP accelerator has finished generating the unique session keys for communicating between the DP accelerator and the one or more additional DP accelerators.

15. The system of claim 14, wherein the operations further comprise:

transmitting, to the DP accelerator, a processing task for the DP accelerator and at least one of the one or more additional DP accelerators to perform, the transmitting secured using the session key established for the host device and the DP accelerator; and receiving, from the DP accelerator, a result from the processing task, the result secured using the session key established for the host device and the DP accelerator.

16. The system of claim 15, wherein transmitting the processing task includes transmitting instructions from the host device to the DP accelerator that a sub-task of the processing task is to be performed by a specific one of the one or more additional DP accelerators.

17. The system of claim 14, wherein the processing task is an artificial intelligence inference.

* * * * *